United States Patent
Tang

(10) Patent No.: US 11,109,353 B2
(45) Date of Patent: Aug. 31, 2021

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/620,854

(22) PCT Filed: Sep. 15, 2017

(86) PCT No.: PCT/CN2017/101953
§ 371 (c)(1),
(2) Date: Dec. 9, 2019

(87) PCT Pub. No.: WO2019/051804
PCT Pub. Date: Mar. 21, 2019

(65) Prior Publication Data
US 2020/0205127 A1    Jun. 25, 2020

(51) Int. Cl.
*H04W 72/02* (2009.01)
*H04W 28/02* (2009.01)
(Continued)

(52) U.S. Cl.
CPC ....... *H04W 72/02* (2013.01); *H04W 28/0278* (2013.01); *H04W 72/087* (2013.01);
(Continued)

(58) Field of Classification Search
CPC ... H04W 72/02; H04W 72/087; H04W 72/10; H04W 72/1273; H04W 28/0278; H04W 92/18
See application file for complete search history.

(56) References Cited

U.S. PATENT DOCUMENTS 10,887,736 B2 *   1/2021   Lee ................... H04W 74/0808
2016/0360524 A1   12/2016  Blasco Serrano et al.
(Continued)

FOREIGN PATENT DOCUMENTS

CN    102333315 A    1/2012
CN    106550457 A    3/2017
(Continued)

OTHER PUBLICATIONS

International Search Report in the international application No. PCT/CN2017/101953, dated Apr. 27, 2018.
(Continued)

*Primary Examiner* — Ajay Cattungal
(74) *Attorney, Agent, or Firm* — Ladas & Parry LLP

(57) ABSTRACT

Provided are a data transmission method, a terminal device, and a network device. The method comprises: a terminal device generates indication information, the indication information being used for indicating a delay requirement of the terminal device; and the terminal device sends the indication information to a network device. In the embodiments of the invention, a terminal device indicates the delay requirement of the terminal device to the network device by means of indication information, so that a network can allocate, according to the delay requirement indicated by the terminal, to the terminal a transmission resource meeting the delay requirement, thereby reducing a transmission delay and improving user experience.

16 Claims, 3 Drawing Sheets

(51) Int. Cl.
  *H04W 72/08* (2009.01)
  *H04W 72/10* (2009.01)
  *H04W 72/12* (2009.01)
  *H04W 92/18* (2009.01)

(52) U.S. Cl.
  CPC ....... *H04W 72/10* (2013.01); *H04W 72/1273* (2013.01); *H04W 92/18* (2013.01)

(56) References Cited

U.S. PATENT DOCUMENTS

| | | | | |
|---|---|---|---|---|
| 2019/0090250 | A1* | 3/2019 | Lee | H04W 72/0446 |
| 2019/0116475 | A1* | 4/2019 | Lee | H04W 72/02 |
| 2019/0124669 | A1* | 4/2019 | Luo | H04W 4/027 |
| 2019/0174530 | A1* | 6/2019 | Kim | H04L 1/0025 |
| 2019/0191461 | A1* | 6/2019 | Lee | H04W 72/04 |
| 2019/0394625 | A1* | 12/2019 | Kim | H04W 4/40 |
| 2020/0214002 | A1* | 7/2020 | Lee | H04W 72/02 |
| 2020/0250993 | A1* | 8/2020 | Li | G08G 5/0091 |

FOREIGN PATENT DOCUMENTS

| | | | |
|---|---|---|---|
| KR | 101546075 | B1 | 9/2015 |
| KR | 20170034023 | A | 3/2017 |
| RU | 2442284 | C2 | 2/2012 |
| RU | 2580514 | C2 | 4/2016 |

OTHER PUBLICATIONS

Written Opinion of the International Search Authority in the international application No. PCT/CN2017/101953, dated Apr. 27, 2018.
Huawei Hisilicon: "Support of QoS for PC5-based V2X transport", 3GPP Draft; R2-167936 Support of QOS for PC5-Based V2X, 3rd Generation Partnership Project (3GPP), Mobile Competence Centre; 650, Route Des Lucioles: F-06921 Sophia-Antipolis Cedex.; France, vol. RAN WG2, No. Reno, USA: Nov. 14, 2016-Nov. 18, 2016 Nov. 13, 2016 (Nov. 13, 2016), XP051177671, Retrieved from the Internet: URL: http://www.3gpp.org/ftp/Meetings_3GPP_SYNC/RAN2/Docs/ [retrieved on Nov. 13, 2018] * p. 1, line 30-line 36 *.
Intel Corporation: "Resource pool sharing between mode 3 and 4", 3GPP Draft, R2-1709049, 3rd Generation Partnership Project (3GPP), Mobile Competence Centre; 650, Route Des Lucioles; F-06921 Sophia-Antipolis Cedex; vol. RAN WG2, No. Berlin, Germany; Aug. 21, 2017-Aug. 25, 2017 Aug. 20, 2017 (Aug. 20, 2017), XP051318842, Retrieved from the Internet: URL: http:/www.3gpp.org/ftp/Meetings_3GPP_SYNC/RAN2/Docs/ [retrieved on Aug. 20, 2017] * the whole document *.
Huawei, HiSilicon. "QoS Requirements for V2X transmission", 3GPP TSG-RAN WG2 Meeting #93bis R2-162284, issued on Apr. 15, 2016, sections 1-3.
Supplementary European Search Report in the European application No. 17925063.4, dated May 18, 2020.
First Office Action of the Chinese application No. 201780090905.4, dated Jun. 12, 2020.
ZTE, Discussion on SPS related issues, 3GPP TSG-RAN WG2 #96 R2-168137 Reno, USA, Nov. 14-18, 2016.
Ericsson, Interdigital, Qualcomm, Configuration of UE Assistance Information, 3GPP TSG-RAN WG2 #96 Tdoc R2-168701 Reno, Nevada, USA, Nov. 14-18, 2016.
Ericsson, Interdigital, ITL, Sidelink SPS Configuration, 3GPP TSG-RAN WG2 #96 Tdoc R2-168702 Reno, Nevada, USA, Nov. 14-18, 2016.
LG Electronics Inc. SPS and UE assistant information for V2X, 3GPP TSG-RAN WG2 #96 R2-168409 Reno, USA, Aug. 14-18, 2016.
Second Office Action of the Chinese application No. 201780090905.4, dated Aug. 31, 2020.
Notice of Rejection of the Chinese application No. 201780090905.4 dated Nov. 16, 2020.
First Office Action of the Russian application No. 2019144787, dated Sep. 2, 2020.
First Office Action of the Canadian application No. 3065831, dated Feb. 4, 2021.

\* cited by examiner

DATA TRANSMISSION METHOD, TERMINAL DEVICE, AND NETWORK DEVICE

RELATED APPLICATION

This application is an application under 35 U.S.C. 371 of International Application No. PCT/CN2017/101953 filed on Sep. 15, 2017, the entire contents of which are incorporated herein by reference.

TECHNICAL FIELD

Embodiments of the disclosure relate to the field of communication, and more particularly to a data transmission method, a terminal device and a network device.

BACKGROUND internet of vehicles system is a Sidelink (SL) transmission technology based on Long Term Evolution Vehicle to Vehicle (LTE V2V). Unlike a conventional LTE system which adopts a manner of receiving or sending communication data through a base station, the Internet of vehicles system adopts a Device to Device (D2D) communication manner and thus has higher spectrum efficiency and lower transmission delay.

In 3rd Generation Partnership Project (3GPP) Release 14 (Rel-14), Vehicle to Everything (V2X) in an Internet of vehicles technology is standardized, and two transmission modes are defined: a mode 3 and a mode 4. Specifically, in the mode 3, as illustrated in FIG. 1, one or more transmission resources for a vehicle terminal (a vehicle terminal 121 and a vehicle terminal 122) are allocated by a base station 110, and the vehicle terminal sends data on an SL according to the transmission resources allocated by the base station 110. The base station 110 may allocate a resource for a single transmission to the terminal and may also allocate a resource for a semi-persistent transmission to the terminal. In the mode 4, as illustrated in FIG. 2, a vehicle terminal (a vehicle terminal 131 and a vehicle terminal 132) adopts a transmission manner of combining sensing and reservation, and the terminal autonomously selects one or more transmission resources on SL resources for data transmission.

In related art, in the mode 4, a terminal device may set a range for selecting a transmission resource to limit a maximum transmission delay. However, in the mode 3, a transmission resource for the terminal device is allocated by a base station, and thus how to ensure that the transmission resource allocated by the base station meets a delay requirement of the terminal device is a problem urgent to be solved in the art.

SUMMARY

A data transmission method, a terminal device and a network device are provided. A delay requirement of a terminal device is indicated to a network device, such that a network may allocate a transmission resource meeting the delay requirement to the terminal according to the delay requirement indicated by the terminal, and thus a transmission delay is reduced and a user experience is improved.

A first aspect provides a data transmission method, which may include the following operations.

A terminal device generates indication information, the indication information being used for indicating a delay requirement of the terminal device.

The terminal device sends the indication information to a network device.

In the embodiments of the disclosure, the terminal device indicates the delay requirement of the terminal device to the network device through the indication information, such that a network may allocate a transmission resource meeting the delay requirement to the terminal according to the delay requirement indicated by the terminal, and thus a transmission delay is reduced and user experience is improved.

In some possible implementation modes, the operation that the terminal device sends the indication information to the network device may include the following action.

The terminal device sends assistance information to the network device, the assistance information being used for the network device to allocate a transmission resource to the terminal device, and the assistance information including a service period of the terminal device and the indication information.

In some possible implementation modes, the operation that the terminal device sends the indication information to the network device may include the following action.

The terminal device sends SL information to the network device, the SL information being used for indicating information of an SL of the terminal device, and the SL information including the indication information.

In some possible implementation modes, the operation that the terminal device sends the indication information to the network device may include the following action.

The terminal device sends priority information of the service of the terminal device to the network device, the priority information being used for indicating the delay requirement of the terminal device.

In some possible implementation modes, the priority information may include a prose per-packet priority (PPPP).

In some possible implementation modes, the operation that the terminal device sends the indication information to the network device may include the following action.

The terminal device sends a Quality of Service (QoS) level to the network device, the QoS level being used for indicating the delay requirement of the terminal device.

In some possible implementation modes, the operation that the terminal device sends the indication information to the network device may include the following action.

The terminal device sends a Buffer Status Report (BSR) to the network device, the BSR including a destination index and Logical Channel Group Identification (LCG ID) and at least one of the destination index or the LCG ID being used for indicating the delay requirement of the terminal device.

In some possible implementation modes, the method may further include the following operations.

The terminal device receives scheduling information sent by the network device, the scheduling information including the transmission resource allocated to the terminal device by the network device; and the terminal device performs transmission of data on the transmission resource.

A second aspect provides a data transmission method, which may include the following operations.

A network device receives indication information sent by a terminal device, the indication information being used for indicating a delay requirement of the terminal device.

The network device allocates a transmission resource to the terminal device according to the indication information.

In some possible implementation modes, the operation that the network device receives the indication information sent by the terminal device may include the following action.

The network device receives assistance information sent by the terminal device, the assistance information being used for the network device to allocate the transmission resource to the terminal device and the assistance information including a service period of the terminal device and the indication information.

In some possible implementation modes, the operation that the network device receives the indication information sent by the terminal device may include the following action.

The network device receives SL information sent by the terminal device, the SL information being used for indicating information of an SL of the terminal device and the SL information including the indication information.

In some possible implementation modes, the operation that the network device receives the indication information sent by the terminal device may include the following action.

The network device receives priority information of a service of the terminal device from the terminal device, the priority information being used for indicating the delay requirement of the terminal device. The operation that the network device allocates the transmission resource to the terminal device according to the indication information may include the following action.

The network device allocates the transmission resource to the terminal device according to the delay requirement of the terminal device indicated by the priority information.

In some possible implementation modes, the priority information may include a PPPP.

In some possible implementation modes, the operation that the network device receives the indication information sent by the terminal device may include the following action.

The network device receives a QoS level sent by the terminal device, the QoS level being used for indicating the delay requirement of the terminal device. The operation that the network device allocates the transmission resource to the terminal device according to the indication information may include the following action.

The network device allocates the transmission resource to the terminal device according to the delay requirement of the terminal device indicated by the QoS level.

In some possible implementation modes, the operation that the network device receives the indication information sent by the terminal device may include the following action.

The network device receives a BSR sent by the terminal device, the BSR including a destination index and an LCG ID, and at least one of the destination index or the LCG ID being used for indicating the delay requirement of the terminal device. The operation that the network device allocates the transmission resource to the terminal device according to the indication information may include the following action.

The network device allocates the transmission resource to the terminal device according to the delay requirement of the terminal device indicated by at least one of the destination index or the LCG ID.

In some possible implementation modes, the method may further include the following operation.

The network device sends scheduling information to the terminal device, the scheduling information including the transmission resource allocated to the terminal device by the network device.

A third aspect provides a terminal device, which may include a generation unit and a transceiver unit.

The generation unit may be configured to generate indication information, the indication information being used for indicating a delay requirement of the terminal device. The transceiver unit may be configured to send the indication information to a network device.

A fourth aspect provides a terminal device, which includes a generator and a transceiver.

The generator is configured to generate indication information, the indication information being used for indicating a delay requirement of the terminal device. The transceiver is configured to send the indication information to a network device.

It is to be understood that the terminal device of the third aspect and the terminal device of the fourth aspect may execute various operations of the method embodiment in the first aspect and any possible implementation mode.

A fifth aspect provides a network device, which may include a transceiver unit and a processing unit.

The transceiver unit may be configured to receive indication information sent by a terminal device, the indication information being used for indicating a delay requirement of the terminal device. The processing unit may be configured to allocate a transmission resource to the terminal device according to the indication information.

A sixth aspect provides a network device, which may include a transceiver and a processor.

The transceiver is configured to receive indication information sent by a terminal device, the indication information being used for indicating a delay requirement of the terminal device. The processor is configured to allocate a transmission resource to the terminal device according to the indication information.

It is to be understood that the terminal device of the fifth aspect and the terminal device of the sixth aspect may execute various operations of the method embodiment in the second aspect and any possible implementation mode.

A seventh aspect provides a computer-readable medium, which is configured to store a computer program, the computer program including an instruction configured to execute the method embodiment of the first aspect or the second aspect.

An eighth aspect provides a computer chip, which includes an input interface, an output interface, at least one processor and a memory. The processor is configured to execute a code in the memory. When the code is executed, the processor may implement various operations executed by a terminal device in a data transmission method of the first aspect.

A ninth aspect provides a computer chip, which includes an input interface, an output interface, at least one processor and a memory. The processor is configured to execute a code in the memory. When the code is executed, the processor may implement various operations executed by a network device in a data transmission method of the second aspect.

A tenth aspect provides a communication system, which includes multiple abovementioned terminal devices.

DETAILED DESCRIPTION

The technical solutions in the embodiments of the disclosure will be described below in combination with the drawings.

Figure 1:
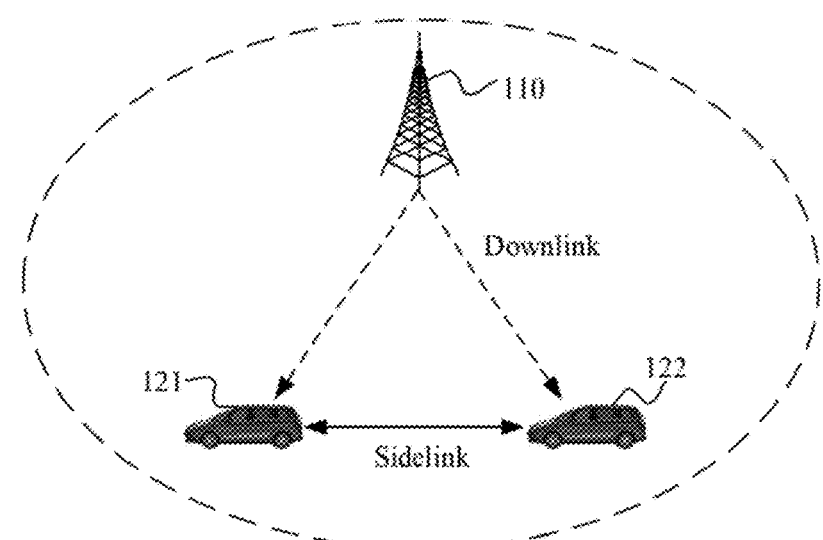
FIG. 1 is a schematic block diagram of a transmission mode according to an embodiment of the disclosure.
Figure 2:
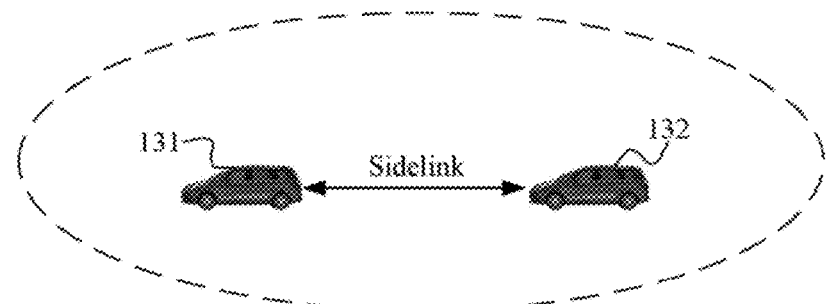
FIG. 2 is a schematic block diagram of another transmission mode according to an embodiment of the disclosure.

The embodiments of the disclosure may be applied to any communication architecture of a terminal device to a terminal device, for example, V2V, V2X and D2D. That is, a system framework, as illustrated in FIG. 1 or FIG. 2, of a vehicle terminal to a vehicle terminal is only an example of the embodiments of the disclosure and the embodiments of the disclosure are not limited thereto.

A terminal device in the embodiments of the disclosure may be any device or apparatus configured with a physical layer and a media access control layer. The terminal device may also be called an access terminal, for example, UE, a user unit, a user station, a mobile radio station, a mobile station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another linear processing device connected to a wireless modem, a vehicle device, a wearable device and the like. Descriptions are made with a vehicle terminal as an example, but the embodiments of the disclosure are not limited thereto.

Figure 3:
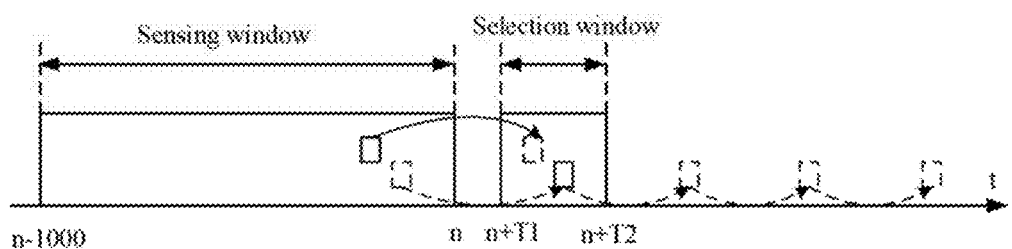
FIG. 3 is a schematic flowchart of a method for sensing a resource pool according to an embodiment of the disclosure.

FIG. 3 is a schematic flowchart of a method for sensing a resource pool for a terminal device according to an embodiment of the disclosure.

As illustrated in FIG. 3, it is assumed that each carrier corresponds to at least one SL process. For example, a carrier corresponds to two SL processes in 3GPP Rel-14. When a new data packet arrives at time n, the terminal device is required to perform resource selection, and the terminal device may perform the resource selection within an interval [n+T1, n+T2] according to a sensing result over a period of time past (for example, Is). Specifically, the terminal device may detect channel quality information corresponding to the one or more resources in a sensing window to select the one or more resources in a selection window.

T≤4 ms; 20 ms≤T2≤100 ms.

In addition, the channel quality information corresponding to the resource may be channel quality (for example, receiving power or receiving quality) of a Physical Sidelink Shared Channel (PSSCH) corresponding to a Physical Sidelink Control Channel (PSCCH). The terminal device may also detect a Receive Signal Strength Indicator (RSSI) of each resource in a transmission resource set to acquire channel quality information corresponding to each resource in the transmission resource set.

It is to be noted that value ranges of T1 and T2 are only examples and should not be limited to the embodiment.

A service in the Internet of vehicles system is periodic, and thus in the embodiment of the disclosure, the terminal device may adopt a semi-persistent transmission manner.

Specifically, when the terminal device selects a resource for transmission, the terminal device may continue to use and reserve the resource for Cresel times. Every time when data is transmitted, Cresel is decreased by 1. When Cresel is decreased to 0, the terminal device may randomly generate a random number within [0, 1] and compares it with a parameter (probResourceKeep). If the generated random number is greater than the parameter, the terminal device performs resource reselection, and if it is less than the parameter, the terminal device continues to use the resource and resets Cresel.

That is, the terminal device of the embodiment of the disclosure may carry information of reserving a resource for a next transmission in control information transmitted at present, such that other terminal devices may detect the control information of the terminal device to determine whether the resource is reserved and used by the terminal device, and thus resource conflicts can be reduced. In other words, according to the embodiment of the disclosure, after selecting a transmission resource, the terminal device may continue to use the transmission resource in multiple transmission periods, and thereby the resource reselection and resource conflict probability are reduced.

It may be found that, when the terminal device acquires a transmission resource by sensing a resource pool, the terminal device may set a range for selecting a transmission resource to limit a maximum transmission delay. However, when the transmission resource for the terminal device is allocated by a network device, how to ensure that the transmission resource allocated by the network device meets a delay requirement of the terminal device is a problem urgent to be solved in the art.

In the embodiments of the disclosure, a data transmission method is provided. A delay requirement of a terminal device is indicated to a network device such that a network may allocate one or more transmission resources meeting the delay requirement to the terminal according to the delay requirement indicated by the terminal, and thus a transmission delay is reduced and a user experience is improved.

Figure 4:
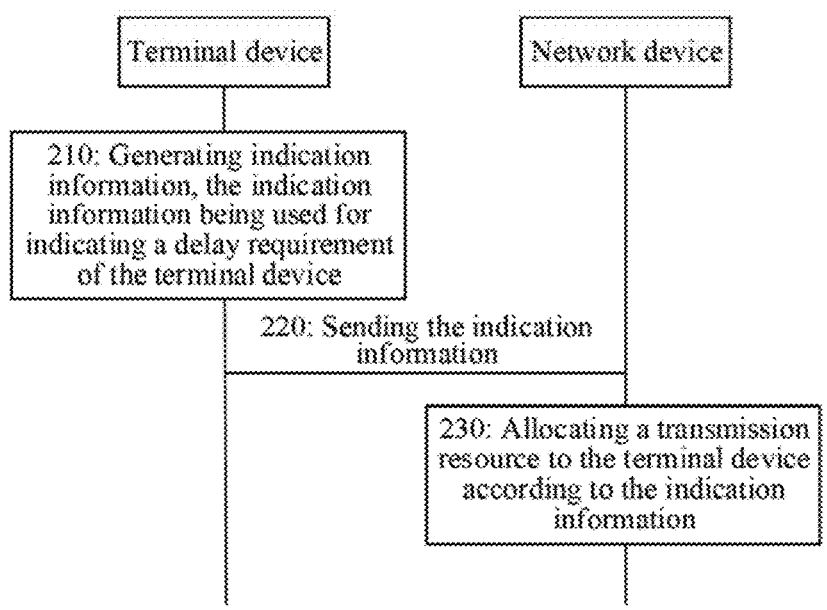
FIG. 4 is a schematic flowchart of a data transmission method according to an embodiment of the disclosure.

FIG. 4 is a schematic flowchart of a data transmission method according to an embodiment of the disclosure.

As illustrated in FIG. 4, the method includes the following operations.

In 210, a terminal device generates indication information, the indication information being used for indicating a delay requirement of the terminal device.

In 220, the terminal device sends the indication information to a network device.

In 230, a transmission resource is allocated to the terminal device according to the indication information.

In brief, the terminal device reports the transmission delay requirement to a network device, such that the network device may allocate one or more transmission resources meeting the delay requirement to the terminal device according to a transmission delay reported by the terminal device, and thus the transmission delay is reduced and a user experience is improved.

In the disclosure, the indication information is used for indicating the delay requirement of the terminal device. However, it is to be noted that a specific indication mode is not limited in the disclosure. For example, a delay requirement of the terminal device within a period of time may be indicated (namely semi-static indication), a fixed delay requirement of the terminal device may also be indicated (namely static indication), and a delay requirement of a service of the terminal device may also be indicated (namely dynamic indication).

It is to be understood that the network device mentioned in the embodiment of the disclosure refers to any device capable of communicating with the terminal device. For example, the network device may be a Base Transceiver Station (BTS) in a Global System of Mobile communication (GSM) or Code Division Multiple Access (CDMA), may also be a NodeB (NB) in a Wideband Code Division Multiple Access (WCDMA) system and may further be an Evolutional Node B (eNB or eNodeB) in an LTE system. Or the network device may be a relay station, an access point, a vehicle device, a wearable device, a network device in a 5G network and the like.

An implementation mode that the terminal device sends the indication information to the network device in the embodiment of the disclosure will be introduced below.

As an embodiment, the terminal device may send assistance information to the network device. The assistance information is used for the network device to allocate one or more transmission resources to the terminal device and the assistance information includes a service period of the terminal device and the indication information. In other words, the network device receives the indication information sent by the terminal device, the indication information being used for indicating the delay requirement of the terminal device; and the network device allocates the one or more transmission resources to the terminal device according to the indication information.

For example, the assistance information may be Semi-Persistent Scheduling (SPS) Assistance Information.

More specifically, the indication information may be carried in the SPS Assistance Information and sent to the network device by the terminal device. After receiving the indication information in the SPS assistance information, the network device configures and allocates a semi-persistent resource to the terminal device. The terminal device transmits data on the semi-persistent resource allocated by the network device.

In the embodiment of the disclosure, the terminal device may not only acquire the transmission resource meeting the delay requirement, but also can continue to use the transmission resource in multiple transmission periods after acquiring the transmission resource, and thus probabilities of resource reselection and resource conflict are reduced.

For another example, the assistance information may further include size information of a certain service. Therefore, after receiving the assistance information, the network device may allocate a special transmission resource meeting the delay requirement for the service.

As another embodiment, the terminal device may send Sidelink UE information to the network device. The SL information is used for indicating information of an SL of the terminal device and the SL information includes the indication information.

Specifically, in related art, if the terminal device supports an SL capability and the terminal is required to perform SL transmission, the terminal device is required to report the SL capability of the terminal through an SL information message.

In the embodiment of the disclosure, the terminal device reports the SL information to the network device and carries the indication information indicating the delay requirement of the terminal device in the SL information, so as to assist the network device during resource scheduling.

As another embodiment, the terminal device may send priority information of the service of the terminal device to the network device, the priority information being used for indicating the delay requirement of the terminal device. That is, the network device allocates the transmission resource to the terminal device according to the delay requirement of the terminal device indicated by the priority information.

For example, the priority information includes a PPPP.

Specifically, different PPPP levels correspond to different transmission delay requirements, and a corresponding relationship between a PPPP and a transmission delay may be pre-configured and may also be configured by the network device. The network device determines a corresponding transmission delay according to a service priority reported by the terminal device, and allocates a transmission resource meeting the transmission delay to a user.

As another embodiment, the terminal device may send a QoS level to the network device, the QoS level being used for indicating the delay requirement of the terminal device. In other words, the network device allocates the transmission resource to the terminal device according to the delay requirement of the terminal device indicated by the QoS level.

Specifically, the terminal device may define a corresponding relationship between multiple QoS levels and multiple delay requirements in a pre-configuration manner or a configuration manner by the network device. Therefore, the network device may allocate the transmission resource to the terminal device according to the delay requirement of the terminal device indicated by the QoS level.

As another embodiment, the terminal device may send a BSR to the network device. The BSR includes a destination index and an LCG ID, and at least one of the destination index or the LCG ID is used for indicating the delay requirement of the terminal device. In other words, the network device allocates the transmission resource to the terminal device according to the delay requirement of the terminal device indicated by at least one of the destination index or the LCG ID.

Specifically, the terminal device may define a corresponding relationship between a destination index or LCG ID and a delay requirement in a pre-configuration manner or a configuration manner of the network device, so as to assist the network device for scheduling.

The destination index may refer to a communication objective in proximity-based service communication, for example, a communication objective in Internet of vehicles communication. The LCG ID represents an ID of an LCG.

It is to be understood that in the embodiment of the disclosure, after the indication information is sent to the network device, the terminal device may further receive scheduling information sent by the network device, the scheduling information including a transmission resource allocated to the terminal device by the network device. The terminal device performs transmission of data on the transmission resource. That is, the network device sends the scheduling information to the terminal device, the scheduling information including the transmission resource allocated to the terminal device by the network device.

It is also to be understood that the embodiment is only an exemplary description of the embodiments of the disclosure and the embodiments of the disclosure should not be limited thereto.

For example, the terminal device may also directly send the indication information to the network device.

It is also to be noted that in the embodiment of the disclosure, the terminal device may explicitly indicate the delay requirement of the terminal device to the network device, and the terminal device may also implicitly indicate the delay requirement of the terminal device to the network device. There are no specific limits made thereto in the embodiment of the disclosure.

For example, when the terminal device implicitly indicates the delay requirement of the terminal device to the network device, the indication information for indicating the delay requirement of the terminal device may be directly sent to the network device, and the assistance information or the SL information may also be sent to the network device. The assistance information or the SL information includes the indication information.

For another example, when the terminal device implicitly indicates the delay requirement of the terminal device to the network device, the delay requirement of the terminal device may be implicitly indicated to the network device through the priority information, the QoS level, and the destination index and LCG ID in the BSR.

For example, it is assumed that the terminal device implicitly indicates the delay requirement of the terminal device to the network device through the QoS level. For the terminal device, the terminal device is only required to send the QoS level of the terminal device to the network device. For the network device, when receiving the QoS level of the terminal device, the network device may determine the delay requirement of the terminal device through the QoS level of the terminal device.

Specifically, the network device may determine the delay requirement corresponding to the QoS level of the terminal device through the corresponding relationship between multiple QoS levels and multiple delay requirements. The QoS level of the terminal device belongs to the multiple QoS levels.

Furthermore, the network device may pre-configure the corresponding relationship for the terminal device, or the network device negotiates with the terminal device to determine the corresponding relationship.

Figure 5:
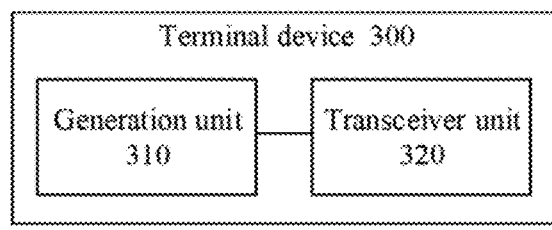
FIG. 5 is a schematic block diagram of a terminal device according to an embodiment of the disclosure.

FIG. 5 is a schematic block diagram of a terminal device 300 according to an embodiment of the disclosure.

As shown in FIG. 5, the terminal device 300 includes a generation unit 310 and a transceiver unit 320.

The generation unit 310 is configured to generate indication information, the indication information being used for indicating a delay requirement of the terminal device. The transceiver unit 320 is configured to send the indication information to a network device.

In at least one embodiment, the transceiver unit 320 is specifically configured to send assistance information to the network device. The assistance information is used for the network device to allocate the transmission resource to the terminal device, and the assistance information includes a service period of the terminal device and the indication information.

In at least one embodiment, the transceiver unit 320 is specifically configured to send SL information to the network device. The SL information is used for indicating information of an SL of the terminal device, and the SL information includes the indication information.

In at least one embodiment, the transceiver unit 320 is specifically configured to send priority information of a service of the terminal device to the network device. The priority information is used for indicating the delay requirement of the terminal device.

In at least one embodiment, the priority information includes a PPPP.

In at least one embodiment, the transceiver unit 320 is specifically configured to send a QoS level to the network device. The QoS level is used for indicating the delay requirement of the terminal device.

In at least one embodiment, the transceiver unit 320 is specifically configured to send a BSR to the network device. The BSR includes a destination index and an LCG ID, and at least one of the destination index or the LCG ID is used for indicating the delay requirement of the terminal device.

In at least one embodiment, the transceiver unit 320 is further configured to receive scheduling information sent by the network device, the scheduling information including the transmission resource allocated to the terminal device by the network device; and perform transmission of data on the transmission resource.

Figure 6:
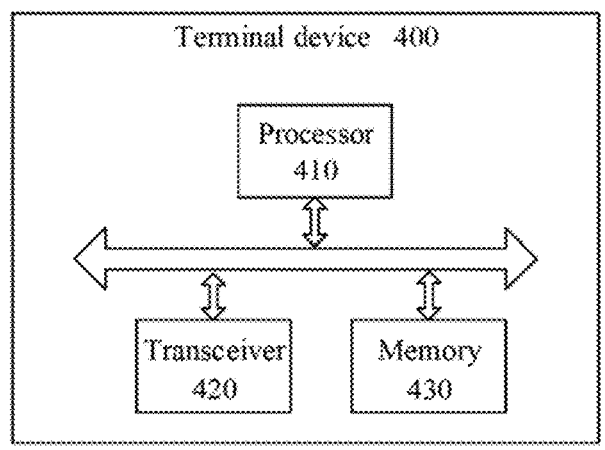
FIG. 6 is a schematic block diagram of another terminal device according to an embodiment of the disclosure.

In the embodiment of the disclosure, the generation unit 310 may be implemented by a processor and the transceiver unit 320 may be implemented by a transceiver. As illustrated in FIG. 6, a terminal device 400 may include a processor 410, a transceiver 420 and a memory 430. The memory 430 may be configured to store indication information, and may further be configured to store a code, instruction and the like executed by the processor 410. Each component in the terminal device 400 is connected through a bus system. The bus system includes a data bus, and further includes a power bus, a control bus and a state signal bus.

The terminal device 400 in FIG. 6 may implement various operations implemented by a terminal device in the method embodiment of FIG. 4, which will not be elaborated herein for avoid repetition. That is, the method embodiment in the embodiments of the disclosure may be applied to a processor or implemented by the processor.

Figure 7:
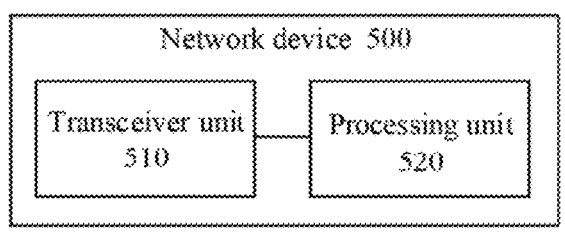
FIG. 7 is a schematic block diagram of a network device according to an embodiment of the disclosure.

FIG. 7 is a schematic block diagram of a network device 500 according to an embodiment of the disclosure.

As illustrated in FIG. 7, the network device 500 includes a transceiver unit 510 and a processing unit 520.

The transceiver unit 510 is configured to receive indication information sent by a terminal device, the indication information being used for indicating a delay requirement of the terminal device. The processing unit 520 is configured to allocate a transmission resource to the terminal device according to the indication information.

In at least one embodiment, the transceiver unit 510 is specifically configured to receive assistance information sent by the terminal device. The assistance information is used for the network device to allocate the transmission resource to the terminal device, and the assistance information includes a service period of the terminal device and the indication information.

In at least one embodiment, the transceiver unit 510 is specifically configured to receive SL information sent by the terminal device. The SL information is used for indicating information of an SL of the terminal device, and the SL information includes the indication information.

In at least one embodiment, the transceiver unit 510 is specifically configured to receive priority information of a service of the terminal device from the terminal device, the priority information being used for indicating the delay requirement of the terminal device. The processing unit 520 is specifically configured to allocate the transmission resource to the terminal device according to the delay requirement of the terminal device indicated by the priority information.

In at least one embodiment, the priority information includes a PPPP.

In at least one embodiment, the transceiver unit 510 is specifically configured to receive a QoS level sent by the terminal device, the QoS level being used for indicating the delay requirement of the terminal device. The processing unit 520 is specifically configured to allocate the transmission resource to the terminal device according to the delay requirement of the terminal device indicated by the QoS level.

In at least one embodiment, the transceiver unit 510 is specifically configured to receive a BSR sent by the terminal device. The BSR includes a destination index and an LCG ID, and at least one of the destination index or the LCG ID is used for indicating the delay requirement of the terminal device. The processing unit 520 is specifically configured to allocate the transmission resource to the terminal device according to the delay requirement of the terminal device indicated by the destination index and/or the LCG ID.

In at least one embodiment, the transceiver unit 510 is further configured to send scheduling information to the terminal device. The scheduling information includes the transmission resource allocated to the terminal device by the network device.

Figure 8:
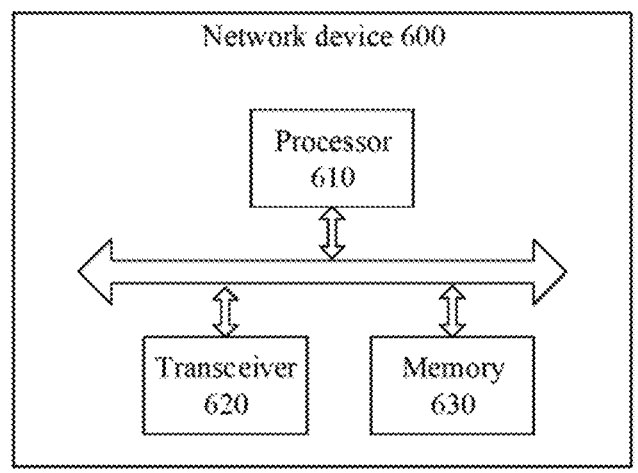
FIG. 8 is a schematic block diagram of another network device according to an embodiment of the disclosure.

In the embodiment of the disclosure, the transceiver unit 510 may be implemented by a transceiver and the processing unit 520 may be implemented by a processor. As illustrated in FIG. 8, a network device 600 may include a processor 610, a transceiver 620 and a memory 630. The memory 630 may be configured to store indication information, and may further be configured to store a code, instruction and the like executed by the processor 610. Each component in the network device 600 is connected through a bus system. The bus system includes a data bus, and further includes a power bus, a control bus and a state signal bus.

The network device 600 in FIG. 8 may implement various operations implemented by a network device in the method embodiment of FIG. 4, which will not elaborated herein for avoid repetition. That is, the method embodiment in the embodiments of the disclosure may be applied to a processor or implemented by the processor.

In an implementation process, various operations of the method embodiment in the embodiments of the disclosure may be completed by an integrated logical circuit of hardware in the processor or an instruction in a software form. More specifically, the operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory and completes the operations of the above method in combination with hardware.

It is to be understood that the processor mentioned in the embodiments of the disclosure may be an integrated circuit chip with a signal processing capability and may implement or execute each method, step and logical block diagram disclosed in the embodiments of the disclosure. For example, the processor may be a universal processor, a Digital Signal Processor (DSP), an Application Specific Integrated Circuit (ASIC), a Field Programmable Gate Array (FPGA) or another programmable logical device, transistor logical device and discrete hardware component. In addition, the universal processor may be a microprocessor or the processor may also be any conventional processor and the like.

In addition, the memory mentioned in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). That is, the memory of a system and method described in the disclosure is intended to include, but not limited to, memories of these and any other proper types.

It is finally to be noted that terms used in the embodiments and appended claims of the disclosure are only for the purpose of describing the specific embodiments, and are not intended to limit the embodiments of the disclosure.

For example, singular forms "a/an", "said", "abovementioned" and "the" used in the embodiments and appended claims of the disclosure are also intended to include plural forms, unless other meanings thereof are clearly expressed in the context.

For another example, based on the context, the term "when" used herein may be explained as "if" or "in case that" or "in condition that" or "responsive to determining" or "responsive to detecting". Similarly, based on the context, phrases "if determining" or "if detecting (stated condition or event)" may be explained as "when determining" or "responsive to determining" or "when detecting (stated condition or event)" or "responsive to detecting (stated condition or event)".

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art can use different methods to implement the described functions for each specific application, but such implementations should not be regarded as a departure from the scope of the embodiments of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the embodiments of the disclosure according to a practical requirement.

In addition, each function unit in the embodiments of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the embodiments of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in the embodiments of the disclosure. The abovementioned storage medium includes: various media capable of storing program codes such as a U disk, a mobile hard disk, a ROM, a RAM, a magnetic disk or an optical disk.

The above is only the specific implementation mode of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the embodiments of the disclosure. Therefore, the scope of protection of the embodiments of the disclosure shall be subject to the scope of protection of the claims.

The invention claimed is:

1. A data transmission method, comprising:
generating, by a terminal device, indication information, the indication information being used for indicating a delay requirement of the terminal device; and
sending, by the terminal device, the indication information to a network device,
wherein sending, by the terminal device, the indication information to the network device comprises:
sending, by the terminal device, priority information of a service of the terminal device to the network device, the priority information being used for indicating the delay requirement of the terminal device,
wherein the priority information comprises a prose per-packet priority (PPPP), and there is a corresponding relationship between PPPP levels and delay requirements of the terminal device, so that the transmission resource meeting the delay requirement indicated by the PPPP is allocated to the terminal device based on the corresponding relationship.

2. The method of claim 1, wherein sending, by the terminal device, the indication information to the network device further comprises:
sending, by the terminal device, assistance information to the network device, the assistance information being used for the network device to allocate a transmission resource to the terminal device, and the assistance information comprising a service period of the terminal device and the indication information.

3. The method of claim 1, wherein sending, by the terminal device, the indication information to the network device further comprises:
sending, by the terminal device, sidelink (SL) information to the network device, the SL information being used for indicating information of an SL of the terminal device, and the SL information comprising the indication information.

4. The method of claim 1, wherein sending, by the terminal device, the indication information to the network device further comprises:
sending, by the terminal device, a Quality of Service (QoS) level to the network device, the QoS level being used for indicating the delay requirement of the terminal device.

5. The method of claim 1, wherein sending, by the terminal device, the indication information to the network device further comprises:
sending, by the terminal device, a Buffer Status Report (BSR) to the network device, the BSR comprising a destination index and a logical channel group identification (LCG ID), and at least one of the destination index or the LCG ID being used for indicating the delay requirement of the terminal device.

6. The method of claim 1, further comprising:
receiving, by the terminal device, scheduling information sent by the network device, the scheduling information comprising the transmission resource allocated to the terminal device by the network device; and
performing, by the terminal device, transmission of data on the transmission resource.

7. A terminal device, comprising:
a processor, configured to generate indication information, the indication information being used for indicating a delay requirement of the terminal device; and
a transceiver, configured to send the indication information to a network device,
wherein the transceiver is further configured to,
send priority information of a service of the terminal device to the network device, the priority information being used for indicating the delay requirement of the terminal device,
wherein the priority information comprises a prose per-packet priority (PPPP), and there is a corresponding relationship between PPPP levels and delay requirements of the terminal device, so that the transmission resource meeting the delay requirement indicated by the PPPP is allocated to the terminal device based on the corresponding relationship.

8. The terminal device of claim 7, wherein the transceiver is further configured to:
send assistance information to the network device, the assistance information being used for the network device to allocate a transmission resource to the terminal device and the assistance information comprising a service period of the terminal device and the indication information.

9. The terminal device of claim 7, wherein the transceiver is further configured to:
send sidelink (SL) information to the network device, the SL information being used for indicating information of an SL of the terminal device, and the SL information comprising the indication information.

10. The terminal device of claim 7, wherein the transceiver is further configured to:

send a Quality of Service (QoS) level to the network device, the QoS level being used for indicating the delay requirement of the terminal device.

11. The terminal device of claim 7, wherein the transceiver is further configured to:
send a Buffer Status Report (BSR) to the network device, the BSR comprising a destination index and a logical channel group identification (LCG ID), and at least one of the destination index or the LCG ID being used for indicating the delay requirement of the terminal device.

12. The terminal device of claim 7, wherein the transceiver is further configured to:
receive scheduling information sent by the network device, the scheduling information comprising the transmission resource allocated to the terminal device by the network device; and
the processor is further configured to perform transmission of data on the transmission resource.

13. A network device, comprising:
a transceiver, configured to receive indication information sent by a terminal device, the indication information being used for indicating a delay requirement of the terminal device; and
a processor, configured to allocate a transmission resource to the terminal device according to the indication information,
wherein the transceiver is further configured to:
receive priority information of a service of the terminal device from the terminal device, the priority information being used for indicating the delay requirement of the terminal device,
wherein the priority information comprises a prose per-packet priority (PPPP), there is a corresponding relationship between PPPP levels and delay requirements of the terminal device, and the network device allocates, based on the corresponding relationship, the transmission resource meeting the delay requirement indicated by the PPPP to the terminal device.

14. The network device of claim 13, wherein the transceiver is further configured to:
receive assistance information sent by the terminal device, the assistance information being used for the network device to allocate the transmission resource to the terminal device, and the assistance information comprising a service period of the terminal device and the indication information;
or,
receive sidelink (SL) information sent by the terminal device, the SL information being used for indicating information of an SL of the terminal device, and the SL information comprising the indication information.

15. The network device of claim 13, wherein the transceiver is further configured to:
receive a Quality of Service (QoS) level sent by the terminal device, the QoS level being used for indicating the delay requirement of the terminal device; and
the processor is configured to:
allocate the transmission resource to the terminal device according to the delay requirement of the terminal device indicated by the QoS level.

16. The network device of claim 13, wherein the transceiver is further configured to:
receive a Buffer Status Report (BSR) sent by the terminal device, the BSR comprising a destination index and a logical channel group identification (LCG ID), and at least one of the destination index or the LCG ID being used for indicating the delay requirement of the terminal device; and
the processor is configured to:
allocate the transmission resource to the terminal device according to the delay requirement of the terminal device indicated by at least one of the destination index or the LCG ID.

* * * * *